Patented May 30, 1933

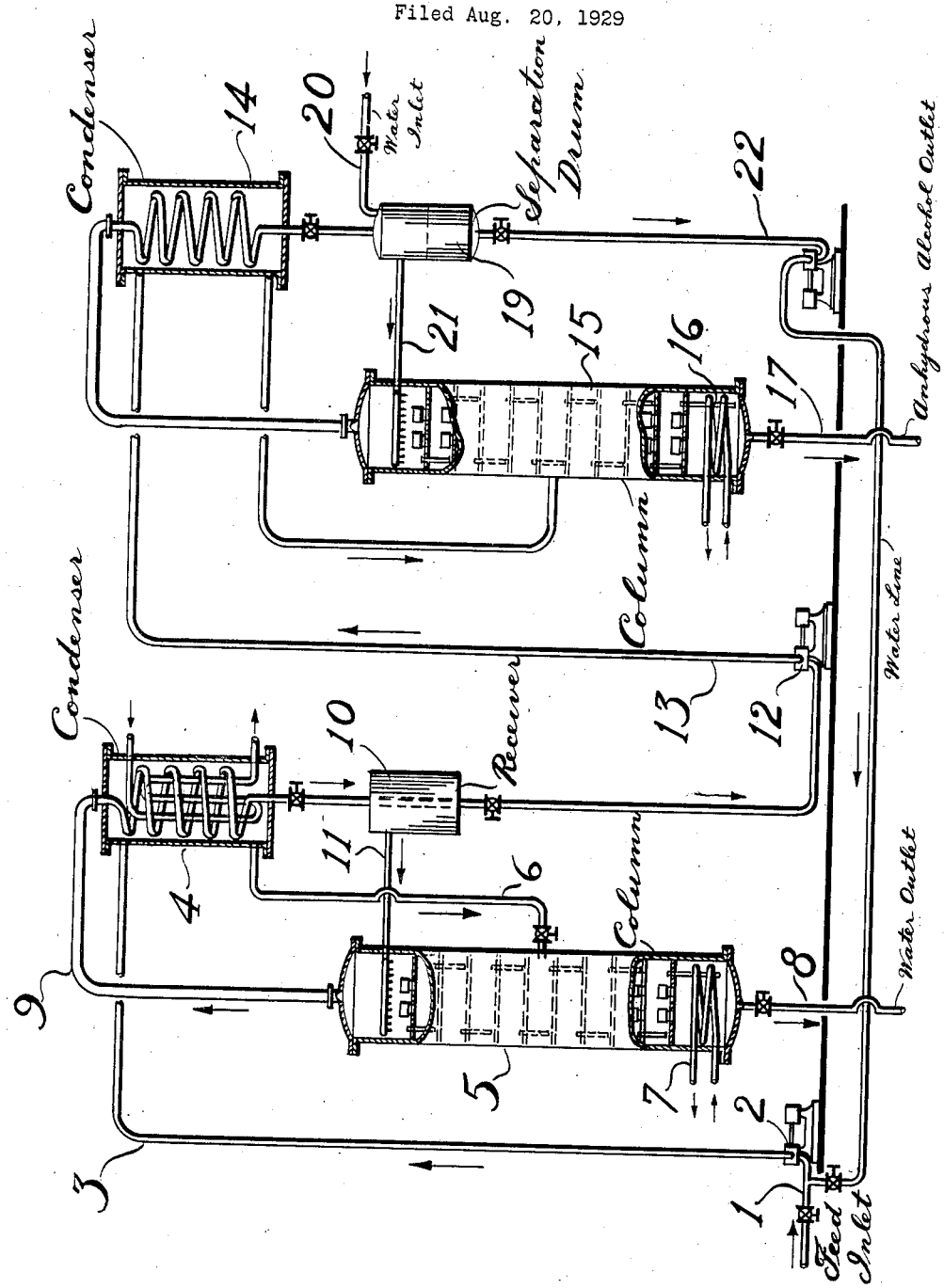

1,911,829

UNITED STATES PATENT OFFICE

ROBERT B. LEBO, OF ELIZABETH, NEW JERSEY, ASSIGNOR TO STANDARD OIL DEVELOPMENT COMPANY, A CORPORATION OF DELAWARE

PROCESS FOR PRODUCING DEHYDRATED SECONDARY ALCOHOLS

Application filed August 20, 1929. Serial No. 387,250.

The present invention relates to an improved process for producing anhydrous alcohols and more specifically comprises an advantageous distillation method for obtaining isopropyl and other secondary alcohols in a substantially anhydrous state from their aqueous mixtures. My process will be fully understood from the drawing and the following description.

The drawing is a semi-diagrammatic view in sectional elevation of an apparatus suitable for my improved process.

Referring to the drawing, reference numeral 1 denotes a feed line which conducts an aqueous solution of isopropyl or other secondary alcohols from any convenient storage (not shown) to pump 2, thence by line 3 through condenser 4 for preheat and into an intermediate section of a rectification column 5 by way of pipe 6. The column is of any well known suitable design, such as a packed column, or fitted with bell cap plates. Coil 7 heats the lower part of the column and water, free of alcohol, is withdrawn from the lower end by line 8 to the sewer.

Vapor comprising a constant boiling mixture of alcohol and water is taken from the upper end of the column by line 9, condensed in condenser 4 and collected in a receiver 10. Part of the distillate is returned to column 5 by line 11 and the rest is forced by pump 12 through line 13, condenser coil 14 and into a second rectifying column 15 which may be similar in design to column 5. In this column the mixture is rectified in the presence of a third substance, the nature of which will be disclosed below, and anhydrous alcohol is withdrawn from the lower end of the column, which is heated by coil 16, by means of line 17 to storage (not shown).

The ternary constant boiling mixture is taken over as a vapor from column 15 to condenser 14 and to separation drum 19 to which a regulated quantity of water is added continuously by line 20 when isopropyl alcohol is rectified. Water need not be added for alcohols higher than isopropyl. The distillate separates into two layers, of which the upper is returned to column 15 as reflux by line 21, and the lower, which comprises a diluted mixture of isopropyl or other alcohol and water is returned to column 5 by line 22 for reconcentration to the strength of the constant boiling mixture.

In the operation of my process, I have discovered that constant boiling mixtures of isopropyl and other secondary alcohols with water can be rectified in the presence of a third substance with the elimination of anhydrous alcohol as a residue and formation of a distillate comprising the alcohol, water and the third substance. This distillate is homogeneous in the case of isopropyl alcohol if xylene is used but if water is then added a separation of phases occurs, the upper containing isopropyl alcohol and xylene, the lower, a solution of only alcohol and water which is more dilute than the constant boiling mixture and which be reconcentrated and further separated. If benzene or toluene be used with isopropyl alcohol, the constant boiling mixture separates into two layers as stated above.

The substance which is added to form the ternary constant boiling mixture is in general a hydrocarbon, such as benzene, toluene, xylene, cyclohexane or the like or a petroleum naphtha boiling within the range of 80° and 140° C. The quantity of the third component is somewhat indefinite since it is not used up in the process and circulates from the tower to condenser and back by way of the distillate receiver. Ordinarily, it is sufficient to fill the upper flow plates of the column and about 1/3 to 1/2 of the receiver with the substance before starting operation.

The constant boiling mixture of isopropyl alcohol and water has the following composition and boils at 80.37° C.:

| | Percent by weight |
|---|---|
| Isopropyl alcohol | 87.9 |
| Water | 12.1 |

When toluene is used as the third substance, the ternary constant boiling mixture boils at 76.5° C. and separates into layers of the following composition:

|   | Upper phase | Lower phase |
|---|---|---|
|   | Percent | Percent |
| Isopropyl alcohol | 42.0 | 40.0 |
| Water | 6.0 | 60.0 |
| Toluene | 52.0 |   |

The lower layer is 6.5% by volume of the total distillate.

If xylene is used to separate mixtures of isopropyl alcohol and water, it is desirable to add the minimum quantity of water to the distillate, which will cause separation of phases but if a greater quantity of water than this minimum is added, the lower phase is more dilute. The composition of the upper phase is not appreciably changed. With other substances the temperature and compositions vary somewhat as might be expected but the process is substantially the same.

Secondary butyl alcohol can be very easily dehydrated according to the present method, especially by the use of xylene. Secondary butyl alcohol and xylene form a mixture which stratifies readily without the addition of water.

The principal use of the present invention is in the dehydration of aqueous secondary alcohols containing water in amount greater than is present in the constant boiling mixture of water and alcohol. By the method described it is possible to work off the excess water before the constant boiling mixture is subjected to rectification in the presence of the third component, namely, benzol, xylene, or the like My invention is not to be limited to any theory of the mechanism of the process nor to any example of its operation given merely for illustrative purposes but only by the following claims in which I wish to claim all novelty inherent in my invention.

I claim:

1. Process of dehydrating aqueous aliphatic secondary alcohols containing water in excess of the amount present in the constant boiling mixture of alcohol and water, comprising subjecting the aqueous alcohol to a first rectification stage in which a constant boiling mixture is removed as distillate and the excess water is removed as residue, passing the constant boiling mixture produced thereby into a second rectification stage, supplying to the vapors of said last mentioned stage a hydrocarbon adapted to form a ternary constant boiling mixture with the alcohol and water, and segregating a residue of substantially anhydrous alcohol.

2. Process according to claim 1, in which the constant boiling mixture from the first rectification stage is condensed, a portion is returned as reflux to the first rectification stage, and the remainder is passed into the second rectification stage.

3. Process according to claim 1, in which vapors are taken off from the second rectification stage, condensed, the condensate stratified, the upper layer containing the hydrocarbon liquid is returned to the second rectification stage, and the lower layer containing aqueous alcohol is returned to the first rectification stage.

4. Process of dehydrating secondary butyl alcohol containing water in excess of the amount present in the constant boiling mixture of alcohol and water, comprising subjecting the aqueous alcohol to a first rectification stage in which a constant boiling mixture is removed as distillate and the excess water is removed as residue, passing the constant boiling mixture produced thereby into a second rectification stage, supplying xylene to the vapors of said last mentioned stage in a quantity adapted to form a ternary constant boiling mixture with the alcohol and water, and segregating a residue of substantially anhydrous alcohol.

ROBERT B. LEBO.